United States Patent
Frey-Ganzel et al.

(10) Patent No.: US 7,703,096 B1
(45) Date of Patent: Apr. 20, 2010

(54) METHOD TO RESOLVE AMBIGUITIES FOR MONITORING AND AUTOMATING UNIX PROCESSES

(75) Inventors: Gabriele Frey-Ganzel, Althengstett (DE); Roland Haibl, Kammlach (DE); Juergen M. Holtz, Pleidelsheim (DE); Walter Schueppen, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/400,347

(22) Filed: Mar. 9, 2009

(51) Int. Cl.
- G06F 9/46 (2006.01)
- G06F 17/13 (2006.01)
- G06F 17/00 (2006.01)

(52) U.S. Cl. .................. 718/100; 718/106; 707/10; 707/104.1

(58) Field of Classification Search ............ 718/100, 718/106; 707/10, 104.1
See application file for complete search history.

(56) References Cited

U.S. PATENT DOCUMENTS

| | | | |
|---|---|---|---|
| 6,112,243 A * | 8/2000 | Downs et al. | 709/226 |
| 6,286,025 B1 | 9/2001 | Chang | |
| 6,741,994 B1 * | 5/2004 | Kang et al. | 707/102 |
| 6,760,912 B1 * | 7/2004 | Yarsa et al. | 719/315 |
| 2006/0069801 A1 * | 3/2006 | Rich et al. | 709/232 |
| 2007/0111773 A1 * | 5/2007 | Gururajan et al. | 463/11 |
| 2007/0115982 A1 * | 5/2007 | Pope et al. | 370/392 |
| 2009/0007109 A1 | 1/2009 | Kang | |

* cited by examiner

*Primary Examiner*—Thomas Lee
*Assistant Examiner*—Jennifer N To
(74) *Attorney, Agent, or Firm*—Oppenheimer Wolff & Donnelly LLP

(57) ABSTRACT

The present invention provides a method to resolve ambiguities for monitoring and automating UNIX processes by providing a multi-level filter routine and search approach that interrogates the active process table to identify the specific process by matching unique process criteria stored during configuration of the automation product. The filter and search method goes beyond process name, as process names are often not unique in UNIX environments, and includes process parameters and information by which the process was invoked.

3 Claims, 6 Drawing Sheets

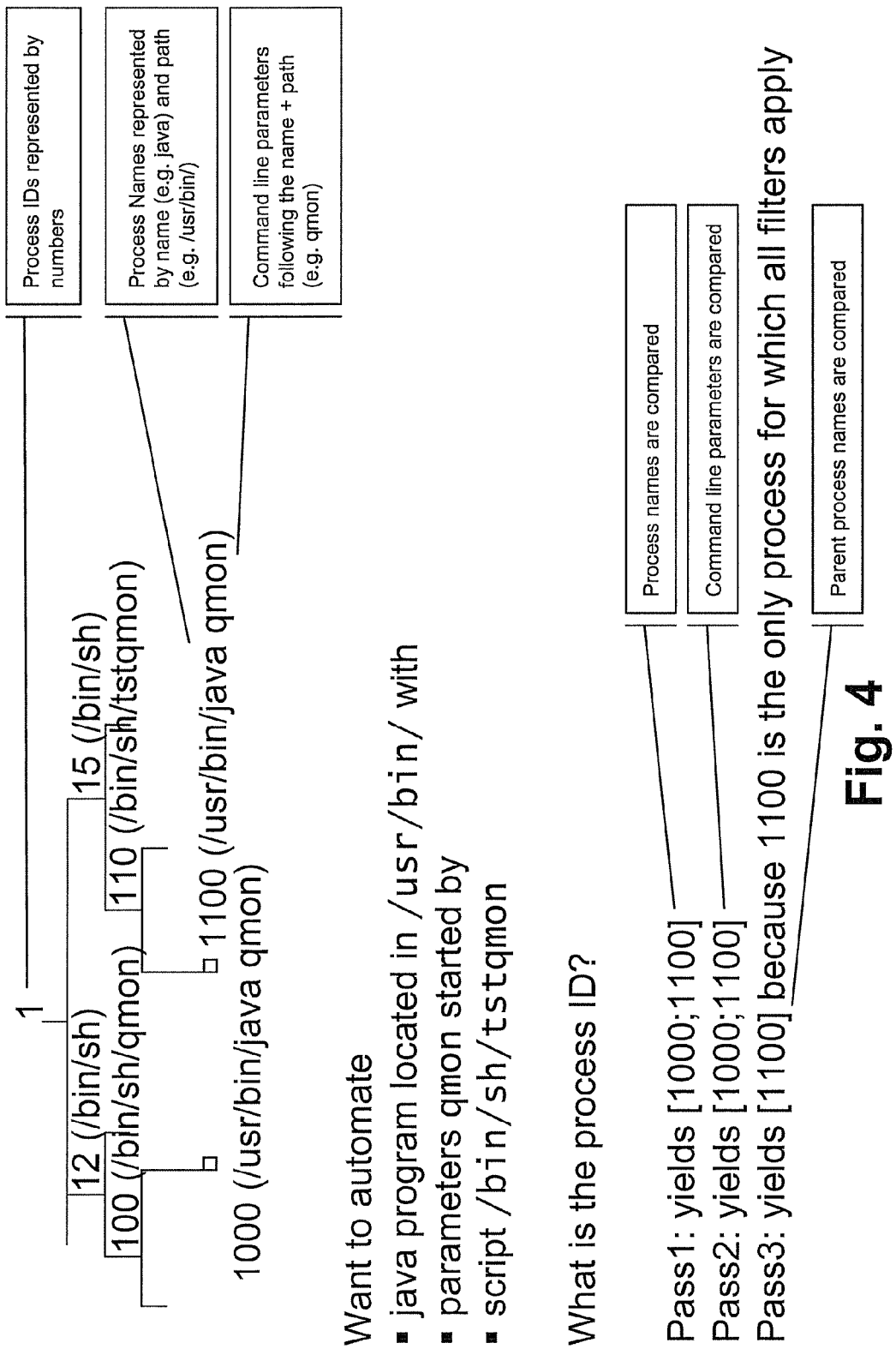

US 7,703,096 B1

METHOD TO RESOLVE AMBIGUITIES FOR MONITORING AND AUTOMATING UNIX PROCESSES

FIELD OF THE INVENTION

The present invention generally relates to software process monitoring on computer systems operating in a UNIX environment. The present invention specifically relates to a method to resolve ambiguities that result from the use of non-unique process names for identification when monitoring and automating UNIX processes.

BACKGROUND OF THE INVENTION

Names of software processes executing under UNIX environments are not necessarily unique. For example, all Java programs have a process name of "install_path java." UNIX environments assign a unique process ID to each active process and require this process ID as a parameter on external requests to manage a specific process. Therefore, external automation products like, for example, Tivoli System Automation for z/OS, are required to first lookup and identify the correct process ID, in the process table, before requests can be sent to monitor and automate that process. Automation products unsuccessfully attempt to identify processes by name, because automation products do not have a way to resolve which unique process ID to select from a potentially long list of identically named processes. Some automation products simply select the first process found with the matching name. Therefore, today, only processes with unique process names can reliably be monitored out-of-the-box by automation products.

Software processes executing under UNIX environments are managed in a hierarchical tree structure containing links to the parent process. There is a root process which has a process ID of 1. Each process may create as many child processes as needed. Each child process in turn is assigned its own unique process ID. The UNIX environment keeps the process name, command line parameters, process attributes, and a backward pointer to the parent process, for each active process in a process table. While process names may not be unique, consideration of the command line parameters of that process or the attributes of the parent process may be useful in differentiating between similarly named processes.

Additionally, it is becoming more common for large computer systems, such as mainframes, to support a UNIX environment as far as automation is concerned. For example, within IBM's z/OS, there is a UNIX environment called UNIX System Services (USS), capable of running multiple UNIX processes. USS is a complete UNIX kernel that runs in parallel to and is tightly integrated with the traditional mainframe base control program (BCP). Operators of these large computer systems wish to monitor and automate UNIX applications in the same way as they automate their existing legacy jobs, from the same operator's console and without the need for special skills. A UNIX application in this context is a program which in turn is a sequence of coded instructions. When this program is started, an environment has to be created for it consisting of a program counter, storage, and other mechanisms an operating system needs to control proper execution of that program. This environment is called a process. Each process has a unique ID while the program name may be ambiguous. As used herein, the term "process name" means the name of the program and the path within the UNIX filesystem, where the program is located that is currently executing within this process.

One current method used to identify similarly named processes is to create symbolic unique links. However, the creation of these links is a manual activity and requires both setup to the application itself and the adding of plain automation rules to the automation product. The complexity of the automation environment and the manual effort for managing this environment grows with the number of symbolic links.

A second method used to identify similarly named processes is to create a wrapper script with a unique name. However, with this approach, the automation product would only be able to monitor the script process and not the actual process started by the script.

What is needed in the art is a way to allow an automation product to automate not only on the basis of process name, but also based on the start parameters sent to the process and by the method the process was invoked.

BRIEF SUMMARY OF THE INVENTION

The present invention provides a new and unique method to allow an automation product to automate not just on the basis of process name, but also based on the parameters passed to the process on startup and by the method that the process was invoked. Considering first the parameters passed to the process on startup, a Java program, for example, usually gets passed the name of a startable class, which can be used as an indication to help identify the correct process. However, this does not help in the cases where it is needed to start, monitor, and automatically stop individual instances of Java programs using the same class. The present invention follows a multi-level filter approach that integrates with the present environment, but overcomes the current deficiencies. The multi-level filter is specified outside of the system.

If the specific process can not be identified by command line parameters only, the next possible indication is to look at the way this process was originally invoked. Often, scripts are used in UNIX environments that do some preparation in the shell environment, before control is passed to the actual program running in its own process and having its own process ID. Therefore, another way to uniquely identify a process from the outside is to differentiate by the parent process. However, it is possible that the parent process created more than one process with the same name and the same parameters.

Finally, the multi-level filter routine is implemented such that it continues recursively or iteratively until enough types and levels of filters have been examined that the specific process is identified or it is determined that the process does not exist. Therefore, if uniqueness is not accomplished at the process level, then the process' parent is searched. If uniqueness is not accomplished at the parent level, then the grandparent process and potentially higher levels must be searched.

BRIEF DESCRIPTION OF THE DRAWINGS

FIG. 4 illustrates a process tree representation of a process table.

DETAILED DESCRIPTION OF THE INVENTION

One aspect of the present invention involves the use of a modified process automation product which uses a multi-level filter routine to identify specific processes executing in a UNIX environment. One embodiment of the present invention allows non-uniquely named processes to be identified by the process automation product using process parameters and parent process information, so the processes can be monitored and stopped. Further embodiments of the present invention may be extended to allow additional filter information to be used in the process identification operation.

Figure 1A:
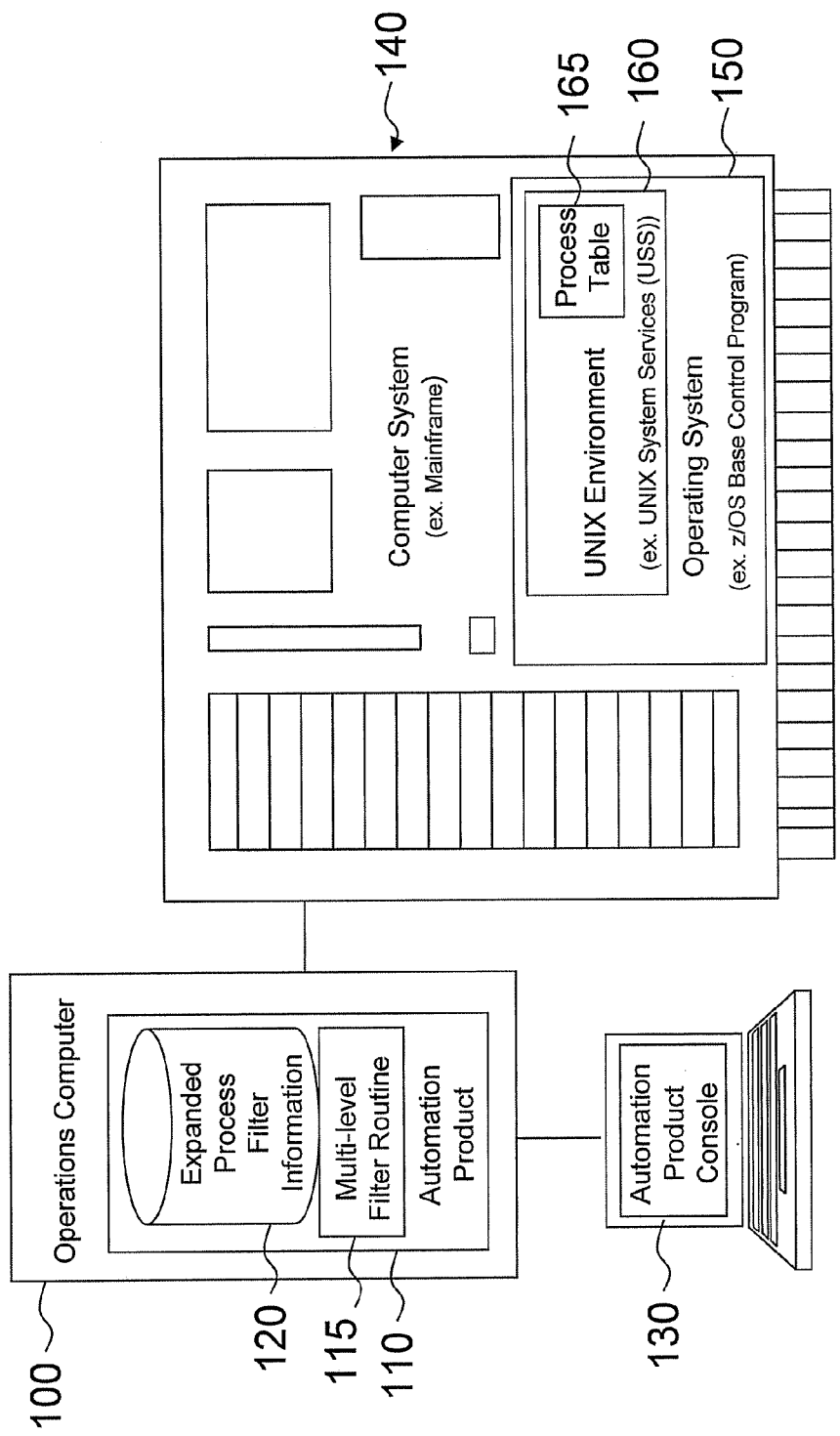
FIG. 1A illustrates an operational environment for one embodiment of the present invention.

FIG. 1A depicts an example implementation environment of the present invention. In one embodiment of the present invention, the components utilized for this invention include (a) a Computer System 140 running an Operation System 150 capable of supporting a UNIX Environment 160, which contains a Process Table 165; (b) an Operations Computer 100 executing an Automation Product 110, incorporating a Multi-level Filter Routine 115, which manages a persistent data structure used to store Expanded Process Filter Information 120; and (c) an Automation Product Console 130, which provides a consistent operator interface for monitoring and automating processes executing on the Computer System 140.

As depicted, an Automation Product Console 130 is used by an operator to configure the Automation Product 110 by asking for the name and path of the automated program and other Expanded Process Filter Information 120, e.g. command line parameter, that will be used by the Multi-level Filter Routine 115 of the Automation Product during process execution to search for processes in the Process Table 165 that match the Expanded Process Filter Information for the process. The Expanded Process Filter Information 120 may be a list of parameters, the name of the script, with or without parameters, used to start the process, or other information that can assist in identifying the specific process. The Expanded Process Filter Information may be manually entered or programmatically pulled from various sources. The present invention does not restrict the type of filter information to be stored.

Figure 1B:
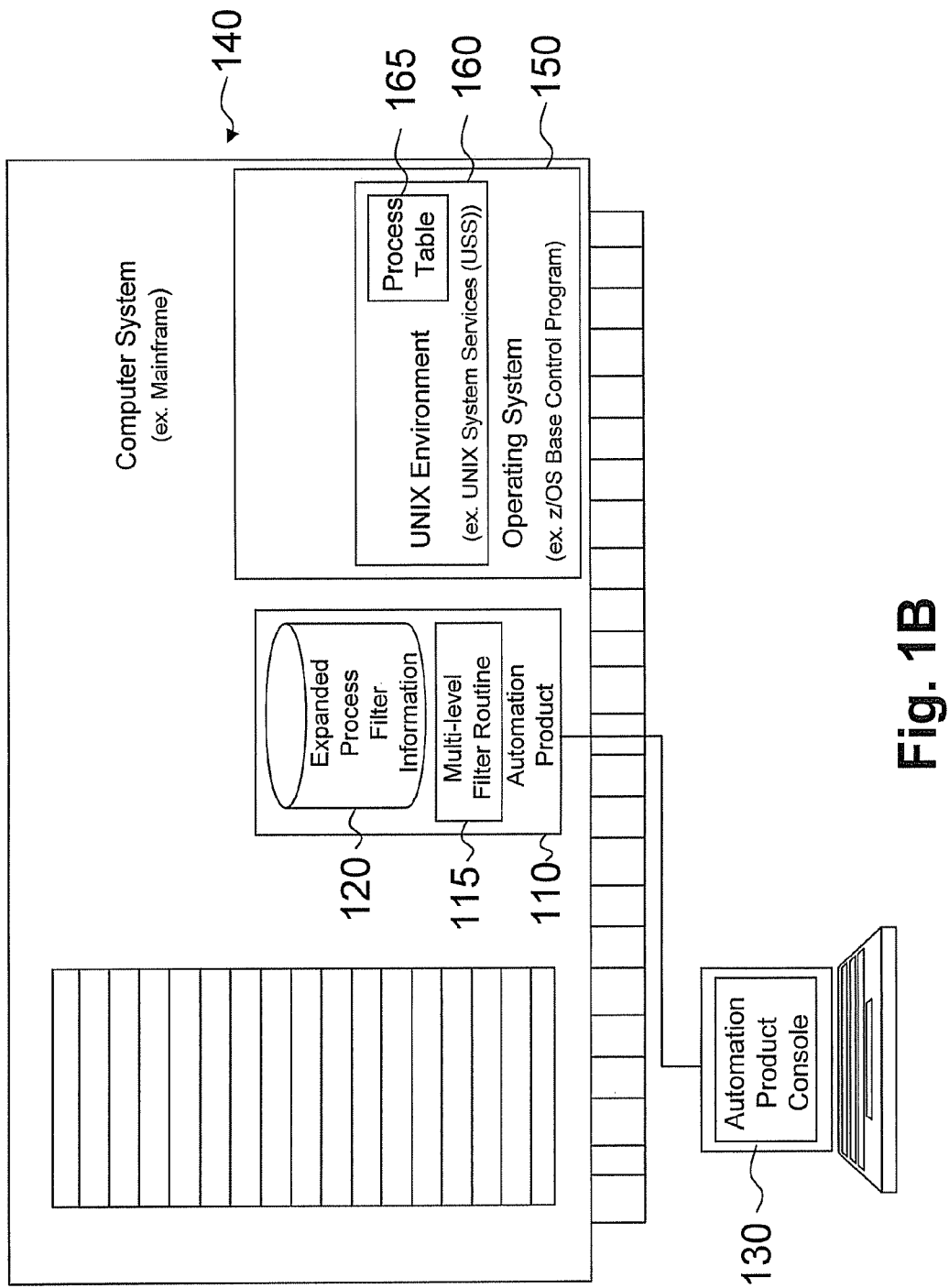
FIG. 1B illustrates an operational environment for another embodiment of the present invention.

Alternatively, in contrast to the configuration shown in FIG. 1A where the Automation Product 110 runs outside the Computer System 140, in another embodiment of the present invention shown in FIG. 1B, the Automation Product 110 runs inside the Computer System 140. For example, System Automation for z/OS provides for an automation product that runs not inside z/OS 150 but on top of the operating system as shown in FIG. 1B. In this configuration, the components include (a) a Computer System 140 running an Operation System 150 capable of supporting a UNIX Environment 160, which contains a Process Table 165, and Automation Product 110 running on top of the Operating System 150, such that the Automation Product 110 incorporates Multi-level Filter Routine 115, which manages a persistent data structure used to store Expanded Process Filter Information 120; and (b) an Automation Product Console 130, which provides a consistent operator interface for monitoring and automating processes executing on the Computer System 140.

Figure 1C:
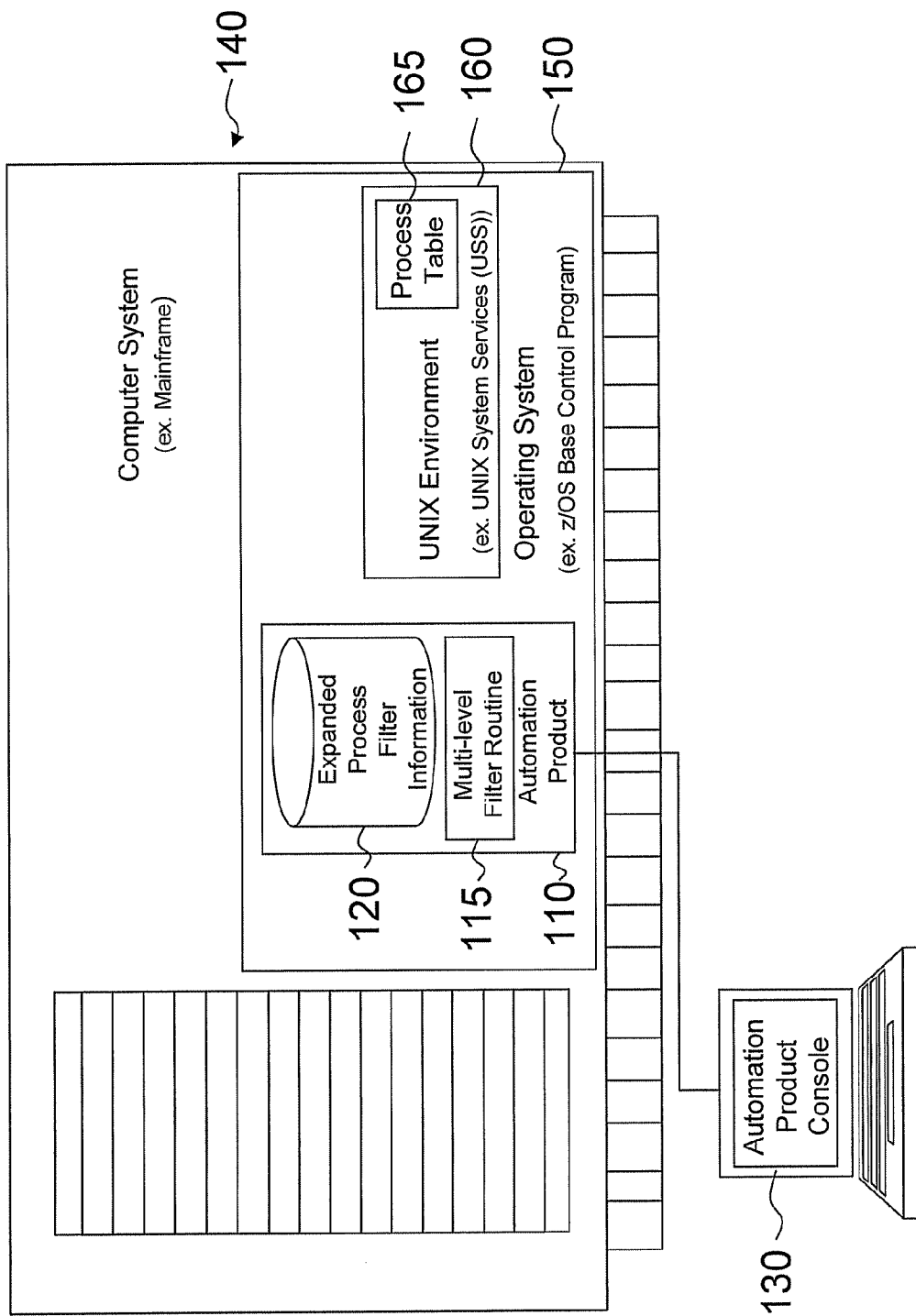
FIG. 1C illustrates an operational environment for yet another embodiment of the present invention.

In yet another embodiment where the Automation Product 110 runs inside the Computer System 140, the automation is performed as part of the operating system as shown in FIG. 1C. In this configuration the components include (a) a Computer System 140 running an Operation System 150 capable of supporting a UNIX Environment 160, which contains a Process Table 165, and Automation Product 110 running in Computer System 140 as a program inside Operating System 150, such that the Automation Product 110 incorporates Multi-level Filter Routine 115, which manages a persistent data structure used to store Expanded Process Filter Information 120; and (b) an Automation Product Console 130, which provides a consistent operator interface for monitoring and automating processes executing on the Computer System 140.

Figure 2:
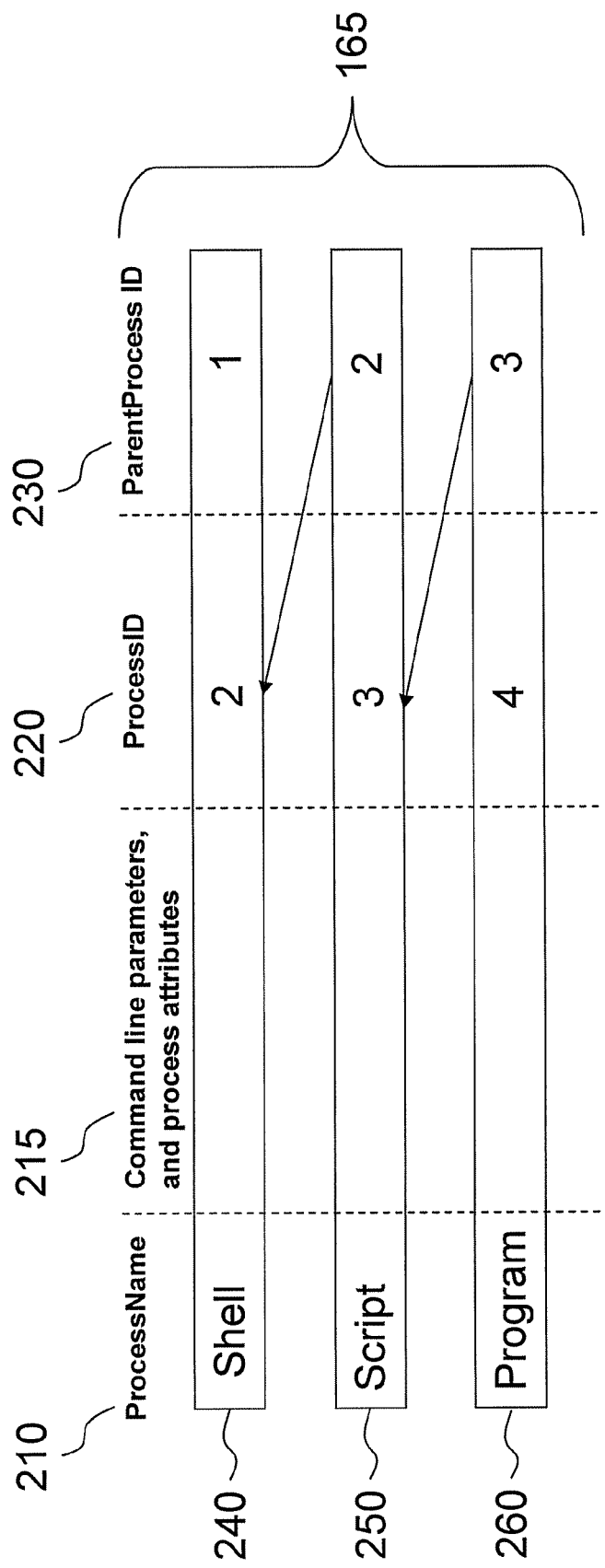
FIG. 2 illustrates an exemplary process table for one embodiment of the present invention.

FIG. 2 depicts the contents of the Process Table 165. The Process Table 165 contains a list of processes currently executing in the UNIX Environment 160. Entries in the Process Table consist of a ProcessName 210, Command line parameters and process attributes 215, a unique ProcessID 220, and the ParentProcessID 230. Process Table 165 may include additional information as desired, such as process status (not shown) and the like. In a UNIX Environment, it is common to execute a Shell process 240 which executes a Script process 250 which further executes a Program process 260. Note that each of these three processes will be assigned a unique ProcessID 220. A hierarchical relationship is maintained by storing the ParentProcessID 230 as an entry in the Process Table. While each process will be assigned a unique ProcessID, the ProcessName 210 is not necessarily unique, and a parent process is allowed to launch multiple identically named processes.

Figure 3:
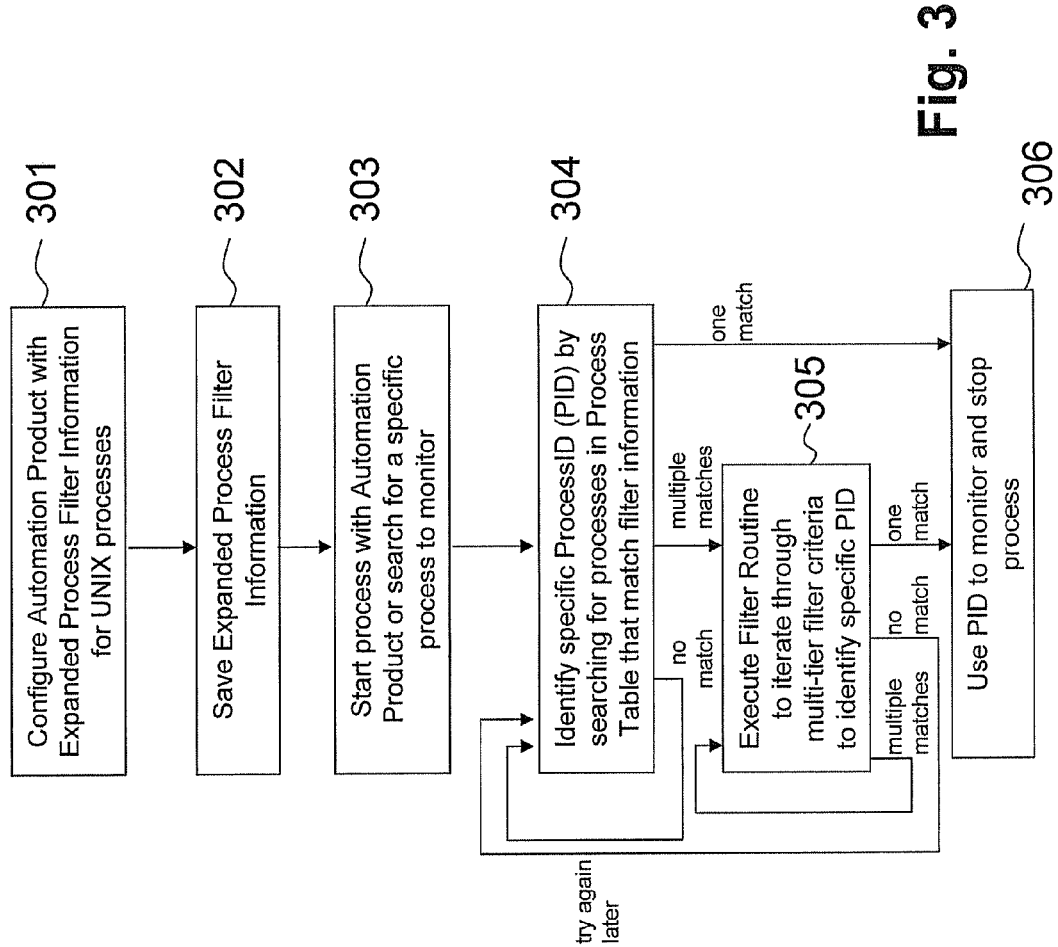
FIG. 3 illustrates an exemplary operation, in accordance with one embodiment of the present invention, of the method for allowing an automation product to automate on the basis of process name, parameters passed to the process on startup, and by the method that the process was invoked.

FIG. 3 depicts a workflow utilized for resolving ambiguities for monitoring and automating UNIX processes. Referring to FIG. 1A in combination with FIG. 2 and FIG. 3, the steps used by the method according to the present embodiment of the invention are as follows:

1. Step 301: An Automation Product Console 130 is used to configure an Automation Product 110 to monitor a process by asking for the name of the program running inside the process (i.e. the ProcessName 210) and asking for Expanded Process Filter Information 120 that allows a Multi-level Filter Routine 115 to search the list of active processes in the Process Table 165 that match the Expanded Process Filter Information for the process.

2. Step 302: The Expanded Process Filter Information 120 is stored external to the Computer System 140. The Multi-level Filter Routine 115 has access to this stored Expanded Process Filter Information to be used to assist in the identification of specific processes executing on the Computer System 140.

3. Step 303: The Automation Product 110 is used to start, monitor and stop UNIX programs, i.e. create, monitor, and terminate processes. In order to automate a process, the Automation Product first monitors the process. In order to monitor the process, the Automation Product knows the program's unique ProcessID 220. When the Automation Product starts a UNIX program it subsequently searches the Process Table 165 to find the ProcessID of the new process that was just started.

4. Step 304: The Multi-level Filter Routine 115 is used to search for the specific process in the Process Table 165. On the initial pass, the Multi-level Filter Routine attempts to identify the process using the ProcessName 210 found in the Process Table and comparing it with the Expanded Process Filter Information 120 specified during configuration of the Automation Product 110 described in Step 301. If the Multi-level Filter Routine fails to find a match, the process may not have been started yet, so a retry will be attempted at a later time until a startup failure is reported after a user-defined time period. If a single match is found, the matching ProcessID 220 is used by the Automation Product 110 to monitor and stop the process. However, if the Multi-level Filter Routine finds more than one matching process, the Multi-level Filter Routine and additional information from the Expanded Process Filter Information 120 will be used to identify the specific process.

5. Step 305: Execute the Multi-level Filter Routine 115 and the associated Expanded Process Filter Information 120 to determine if the first matching ProcessID 220 will be used or if additional search iterations will be executed. Similar actions will be taken depending on the outcome of the latest iteration of the Multi-level Filter Routine. The Multi-level Filter Routine could be implemented in a way such that it continues recursively until all possible types of filters have been examined and the process is either identified or determined not to exist. It is likely that a sole unique match will not be identified even using all of the Command line parameters and process attributes 215. In this situation, the tree structure of the Process Table 165 becomes important and the process' parent is searched. If uniqueness cannot be guaranteed here, investigation needs to continue with the grand-parent process and potentially until the entire tree is searched. Searching by process owners is yet another example of the criteria that may be used to identify a process.

6. Step 306: Finally, the ProcessID 220 which was identified by executing the Multi-level Filter Routine 115 is used by the Automation Product Console 130 to monitor and start/stop the UNIX program.

Referring to FIG. 4, a process tree with two ambiguous processes is shown that both have the same process name and the same command line parameters. Also shown in FIG. 4 is an example, how the multi-pass, multi-level filter routine examines the process tree to identify the process /usr/bin/java with command line parameters qmon and the parent process /bin/sh/tstqmon. Upon execution of the filter routine, the automation product may traverse through the tree multiple times and each time it applies the filter appropriate for that iteration (level). If upon examination of all processes, only one process is found for which the current filter matches, the said filter routine is completed. Similarly, if no process is found, the automation product assumes that the particular process of interest does not yet exist and either stops or retries. However, if upon examination of all processes, multiple processes are found for which the current filter matches, additional filter criteria are provided to resolve the ambiguity in the next iteration. The example shown in FIG. 4, illustrates a bottom-up approach implemented in the filter routine.

On a first pass (Pass1), a comparison of process name (i.e. /usr/bin/java) yields both process 1000 and process 1100, because both have an identical process name, namely /usr/bin/java. On a second pass (Pass2), a comparison of command line parameters (i.e. qmon) also yields both process 1000 and process 1100 because both have the identical command line parameter, namely qmon. On a third pass (Pass3), however, a comparison of parent process attributes (here: parent process name /bin/sh/tstqmon) yields a uniquely identifiable process, namely process 1100, because only process 1100 has a parent process name of /bin/sh/tstqmon. Because the process has been uniquely identified, the filter routine is stopped.

The components described above constitute the minimum set of components required to implement a method to resolve ambiguities for monitoring and automating UNIX processes. Further embodiments of the present invention may be extended by adding filter criteria and logic. Those skilled in the art could make numerous alterations to the disclosed embodiment without departing from the spirit or scope of the inventive subject matter set forth in the specifications and claims.

What is claimed is:

1. A method in a computer system to resolve ambiguities for monitoring and automating UNIX processes, comprising:
   executing an automation product on the computer system, the computer system executing a UNIX environment;
   executing a set-up process on the computer system, the set-up process including:
      configuring the automation product to automatedly monitor a set of unique identifying information for each of a plurality of automation-eligible programs executing in the UNIX environment, the set of unique identifying information including a process name comprising a program name and a program path, command line parameters, and a parent process name comprising a parent program name and a parent program path, identifying a parent program of the automation-eligible program; and
      storing on the computer system the set of unique identifying information for each of the plurality of automation-eligible programs executing in the UNIX environment;
   executing a program in the UNIX environment, said program being an automation-eligible program and said program having n levels on a process tree; and
   executing a multi-pass multi-level filter routine for identifying the program, including the automation product performing the steps of:
      performing a first pass, including:
         requesting from a process table managed by the computer system the process name, comprising the program name and the program path, of the program; and
         comparing the process name of the program from the process table with the set of unique identifying information of the program to determine if the program can be uniquely identified based thereon;
      stopping the multi-pass multi-level filter routine for identifying the program if the program is uniquely identified during the first pass; and
      performing a second pass, if the program is not uniquely identified during the first pass, including:
         requesting from the process table managed by the computer system the command line parameters of the program; and
         comparing the command line parameters of the program from the process table with the set of unique identifying information of the program to determine if the program can be uniquely identified based thereon;
      stopping the multi-pass multi-level filter routine for identifying the program if the program is uniquely identified during the second pass; and
      iteratively performing subsequent passes, if the program is not uniquely identified during the second pass, until (a) the program is uniquely identified or (b) a maximum number of iterations has been reached, wherein the maximum number of iterations is equal to n, each of the subsequent passes being performed on an incremental parent program, said incremental program being the parent program of the immediately preceding program to have a pass performed thereon during execution of the multi-pass multi-level filter routine, and each of the subsequent passes including:

requesting from the process table managed by the computer system the process name of the incremental parent program; and comparing the process name of the incremental parent program from the process table with the set of unique identifying information of the incremental parent program from the operations computer to determine if the program can be uniquely identified based thereon; and stopping the multi-pass multi-level filter routine for identifying the program if the program is uniquely identified based on the subsequent passes; and stopping the multi-pass multi-level filter routine for identifying the program if the maximum number of iterations has been reached without the program being uniquely identified.

2. The method in a computer system of claim 1, wherein the step of iteratively performing subsequent passes further comprises:

requesting from the process table managed by the computer system an attribute of the incremental parent program that may uniquely distinguish processes; and comparing the attribute of the incremental parent program from the process table with the set of unique identifying information of the incremental parent program from the operations computer to determine if the program can be uniquely identified based thereon.

3. The method in a computer system of claim 2, wherein the attribute of the incremental parent program that may uniquely distinguish processes includes command line parameters of the incremental parent program.

* * * * *